Figure 1:
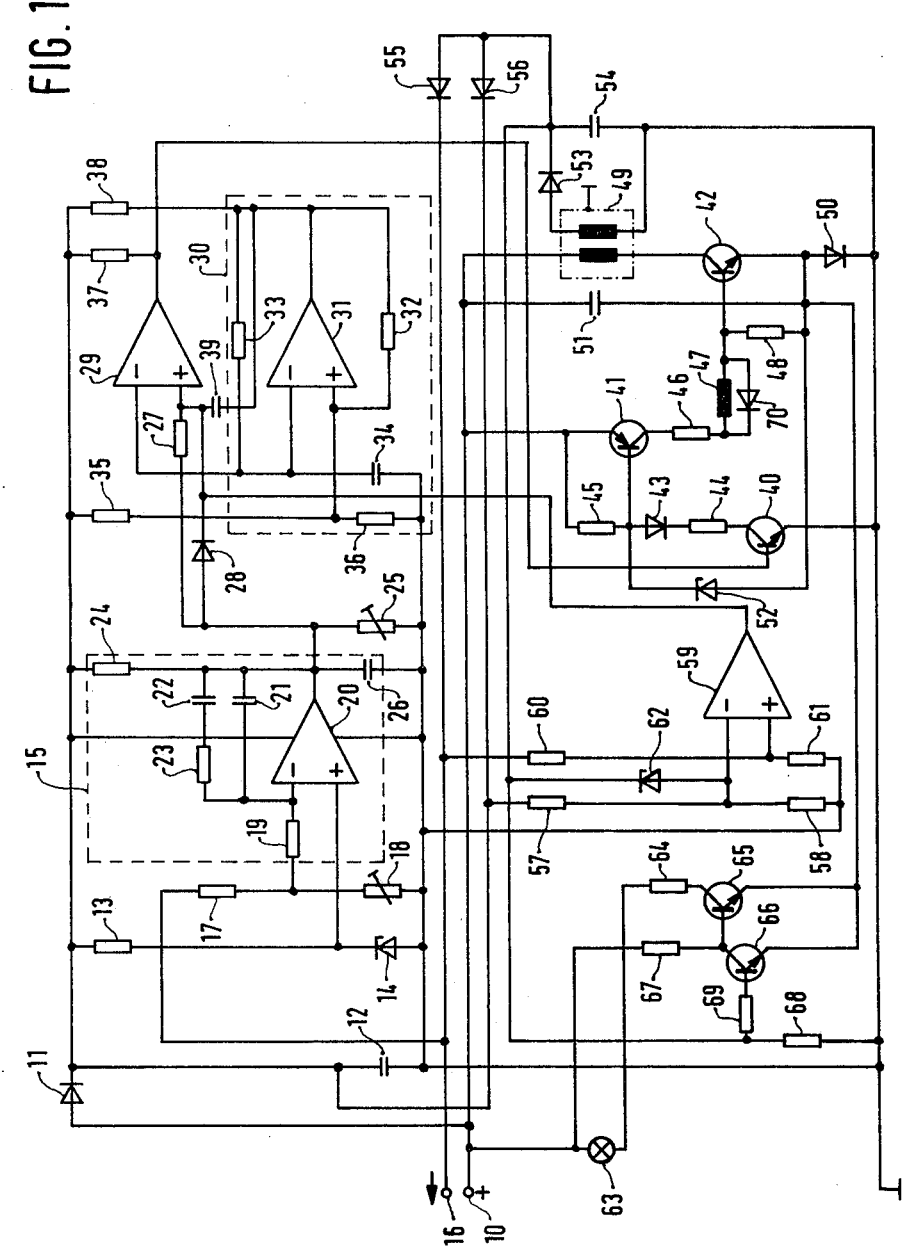

United States Patent [19]

Kühn et al.

[11] 4,439,820
[45] Mar. 27, 1984

[54] PWM, SINGLE-ENDED, SEPARATELY DRIVEN D.C.-D.C. CONVERTER

[75] Inventors: Willi Kühn, Markgröningen; Eberhard Mausner, Ludwigsburg, both of Fed. Rep. of Germany

[73] Assignee: Robert Bosch GmbH, Stuttgart, Fed. Rep. of Germany

[21] Appl. No.: 343,405

[22] Filed: Jan. 28, 1982

[30] Foreign Application Priority Data

Mar. 13, 1981 [DE] Fed. Rep. of Germany ....... 3109612

[51] Int. Cl.³ ............................................ H02P 13/22
[52] U.S. Cl. ...................................... 363/21; 340/663; 363/56
[58] Field of Search ....................... 363/21, 26, 49, 56, 363/97; 340/663

[56] References Cited

U.S. PATENT DOCUMENTS

| 3,670,234 | 6/1972 | Joyce | 363/56 |
| 4,099,068 | 7/1978 | Kobayashi et al. | 340/663 |
| 4,301,497 | 11/1981 | Johari | 363/21 |

FOREIGN PATENT DOCUMENTS

| 55-29234 | 3/1980 | Japan | 363/21 |
| 55-83463 | 6/1980 | Japan | 363/21 |
| 55-97183 | 7/1980 | Japan | 363/21 |

*Primary Examiner*—William H. Beha, Jr.
*Attorney, Agent, or Firm*—Frishauf, Holtz, Goodman & Woodward

[57] ABSTRACT

The rectified output voltage of the transformer of a d.c. to d.c. converter, as represented by a voltage divider output, is compared with a reference voltage in a voltage regulator (15), the output of which is compared in a comparator (29) with a sawtooth wave to produce a sequence of pulses the duration of which depends upon the output voltage of the regulator. These pulses are provided to the transformer through a driver circuit capable of operating at a very low input voltage. One flank of the square wave produced by a component of the sawtooth wave generator is differentiated by a capacitor (39) to provide transient pulses to the transformer to keep it operating in the event the input voltage to the converter exceeds the output voltage. Another comparator (59) is provided to shut down comparator operation when there is a short circuit at the output and also for a brief start-up interval during which capacitors are charged up.

13 Claims, 2 Drawing Figures

PWM, SINGLE-ENDED, SEPARATELY DRIVEN D.C.-D.C. CONVERTER

This invention concerns a regulated d.c. voltage converter of the kind in which a d.c. supply voltage energizes a generator of an alternatingly switched voltage wave which is supplied to a voltage conversion transformer followed by a rectifier, the output of which goes to a voltage regulator, the output of which modifies the wave supplied to the transformer to provide the necessary output voltage regulation. Equipment of the general type just mentioned is disclosed in the periodical "Markt und Technik," No. 37, September 1980, p. 68.

When a d.c. voltage converter of this type is utilized to supply electronic security circuits, medical appliances and military apparatus, where an interruption ("outage") of the voltage supply could have grave consequences, it is not permissible for voltage fluctuations, declining input voltages to the converter, even down to low values, or disturbing potentials to have more than a very slight effect on the voltage supply of the electronic apparatus being served. On the other hand, it is important that the inclusion of various supplementary security circuits should be simple and should be feasible at reasonable cost.

THE INVENTION

It is an object of the present invention to provide a voltage converter that has a highly reliable operating system, even down to very low input supply voltage and is quick to counteract disturbances. It is a further object of the invention to incorporate in the voltage converter a variety of safeguards and monitor features for the output voltage of the voltage regulator contained in the converter without undue complication and expense.

Briefly, a sawtooth wave generator is operated on the input voltage and supplies its output to a first comparator, to another output of which a signal is connected from the output of the voltage regulator for the rectified output of the transformer of the converter. This first comparator has its output connected for supplying voltage pulses for controlling the input wave of the transformer.

Preferably the voltage regulator is constituted as a proportional-integral controller.

It is particularly advantageous to limit the output voltage of the voltage regulator by means of a voltage divider across the input supply voltage having its tap connected to the output of the regulator, from which a storage capacitor is also connected to ground. In this manner the maximum pulse duration for the primary circuit of the transformer can be limited, protecting the corresponding driver transistor against overload and thereby providing a further contribution to the security of the entire system.

It is also particularly desirable to provide a continuous minimum operation of the voltage converter even during input overvoltages, by means of short pulses provided by the sawtooth wave generator to the comparator input to which the output of the voltage regulator is provided.

Thus, even during input overvoltages, the various functions of the voltage converter remain under control.

It is also advantageous for the voltage supply of the electronic components of the regulator, first comparator and sawtooth wave generator circuits to be provided through separate diodes from both the supply voltage of the voltage converter and from the rectified output of the transformer, so that the higher of these voltages will energize these circuits if one of them drops down considerably.

It is particularly desirable to provide a second comparator to compare the output and supply voltages of the voltage converter in such a way that when the converter output voltage falls below a settable proportion of the input voltage, a reduction can be produced in the voltage at that input of the first comparator to which the output voltage of the voltage regulator is applied. This suppresses the converter operation when the output is short-circuited and while the capacitor across the output of the regulator is being initially charged.

It is also desirable to interpose a Zener diode between the output connection of the rectifier and the second comparator to limit the rectified output of the transformer.

Particularly for maintaining operation at very low input voltages, it is highly desirable for the first comparator to drive the transformer primary through a three-stage transistor circuit of which the input and output transistors are npn transistors and the intermediate one is a pnp transistor having its emitter connected directly to the input supply voltage. In this three-stage transistor circuit, the output transistor preferably has an inductance connected in its base current circuit and has its switching path connected to ground through a protective diode for protection against mispolarity.

Finally, it is desirable to provide an indicator, such as a lamp, for providing a warning when the rectified output voltage of the transformer is below a predetermined threshold.

THE DRAWINGS

Figure 2:
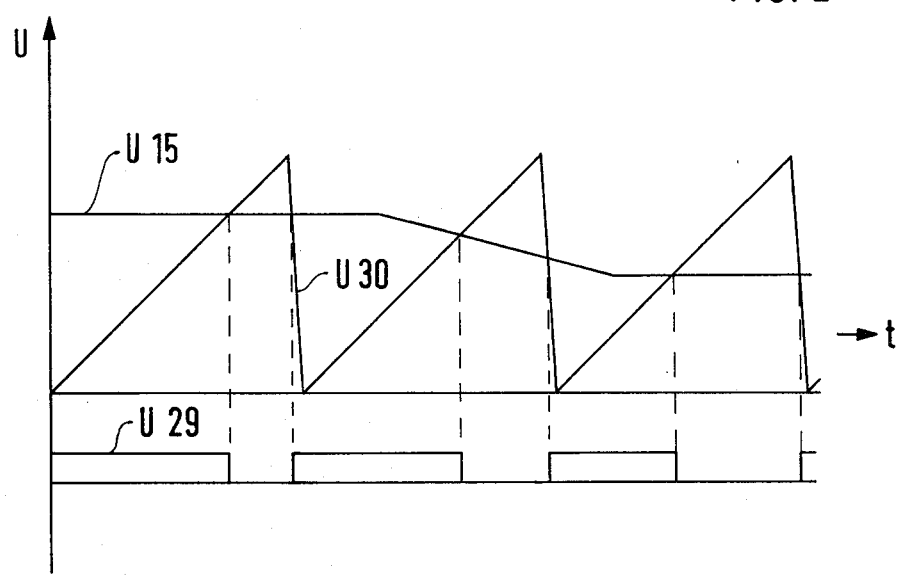

The invention is further described by way of illustrative example with reference to the annexed drawings in which:

FIG. 1 is a circuit diagram of a voltage converter according to the invention, and FIG. 2 is a time-based graph showing voltage waves explaining the operation of the circuit of FIG. 1.

DISCRIPTION OF THE ILLUSTRATED EMBODIMENT

The terminal 10 of the circuit shown in FIG. 1 is provided for connecting the circuit to an input d.c. voltage for energizing the equipment. The terminal 10 energizes one group of circuits of the equipment through a diode 11 which is connected in series with a capacitor 12 that has its other terminal connected to apparatus ground. A series combination of a resistor 13 and a Zener diode 14 is connected in parallel with the capacitor 12. The voltage at the ungrounded terminal of the Zener diode 14 serves as the reference voltage for a proportional-integral controller circuit 15, hereinafter referred to a PI controller.

The terminal 16 is the terminal at which the output voltage of the voltage converter is provided for connection to external equipment to be energized by the voltage converter. A voltage divider consisting of two resistors 17 and 18 is connected between the terminal 16 and ground. The tap connection between the two resistances 17 and 18 supplies a signal representative of the output voltage through a series resistor 19 to another input of the PI controller 15. The resistor 18 is constituted as a variable resistor in order to permit adjustment or setting of the output voltage of the voltage converter to a desired value.

The PI controller 15 consists of a circuit known for itself that includes a comparator 20 which, like the other comparators of this equipment may be an operational amplifier, the comparator in this case having two parallel negative feedback circuit branches. The first negative feedback path consists of only the capacitor 21, whereas the second negative feedback path consists of a capacitor 22 in series with a resistor 23. The resistor 24 serves as the load resistor of the PI controller 15 and the capacitor 26 serves as the integration element of the circuit.

The output voltage of the comparator 20 is applied to the tap of a voltage divider connected across the capacitor 12. The voltage appearing across the capacitor 12 is also connected through a resistor 37 with the output of the comparator 29 and through a resistor 38 with the output of the comparator 31. Finally, the output of the comparator 31 is connected through a capacitor 39 with the noninverting input of the comparator 29. The output of the comparator 29 is connected to the base of a first npn transistor 40 that, together with a pnp transistor 41 and a second npn transistor 42 forms a three stage transistor driver for the transformer 49. The base of the transistor 41 is connected to ground through a diode 43 in series a resistor 44 and the collecter-emitter path of the transistor 40. The emitter of the transistor 41, which is connected to the terminal 10, is also connected through a resistor 45 with its own base. The collector of the transistor 41 is connected to the base of the final stage transistor 42 through a series circuit combination of a resistor 46 and an inductance 47. A resistor 48 is connected between the base and emitter of the transistor 42.

Between the terminal 10 and ground are connected, in series, the primary winding of a voltage converter transformer 49, the collector-emitter path of the transistor 42 and the protective diode 50 that serves to protect against application of a voltage of the wrong polarity.

A capacitor 51 is connected between the emitter of the transistor 42 and the terminal 10 for protection against overvoltages and for compensation of wiring inductances.

In this arrangement, a so-called pressed-in diode having no insulation provisions on its cathode side so that it can lie directly against a ground-potential piece of sheet metal for cooling, can be used as the mispolarity protection diode 50. Such pressed-in diodes are, on the one hand, easy to mount and, on the other economically obtainable as mass produced components in sizes capable of handling high currents.

A Zener diode 52 is connected between the base of the transistor 41 and the emitter of the transistor 42.

The series combination of a diode 53 with a capacitor 54 is connected in parallel to the secondary winding of the transformer 49 for rectification of the output. The terminal of the capacitor 54 away from the diode, namely the one connected to the transformer 49, is grounded. The voltage across the capacitor 54 is connected on the one hand through a diode 55 to the output terminal 16 and, on the other hand, through a diode 56 to the cathode of the diode 11. In this manner the voltage across the capacitor 12 and thereby the supply voltage for the components 13-39 is provided by the higher of the two voltages respectively at the terminals 10 and 16. This serves for additional security of the overall system.

A voltage divider consisting of two resistors 57 and 58 is connected in parallel to the capacitor 12 and has its tap connection connected to the inverting input of another comparator 59. Still another voltage divider consisting of two resistors 60 and 61 is connected between the terminal 16 and ground. The tap of this last-mentioned voltage divider is connected to the noninverting input of the comparator 59, while the output of that comparator is connected to the noninverting input of the comparator 29. A Zener diode 62 is connected between the cathode of the diode 53 and the inverting input of the comparator 59.

A monitoring device for supervising the proper functioning of the voltage converter, in the form of the warning lamp 63, a resistor 64, the collector-emitter path of a transistor 65 and the already-mentioned mispolarity protection diode 50 form a series circuit connected between the terminal 10 and ground. The collector-emitter path of a transistor 66 is connected in parallel to the base-emitter path of the transistor 65. The collector of the transistor 66 is connected through a resistor 67 to the terminal 10. A resistor 68, the voltage drop across which is supplied through 69 to the base of the transistor 66, is connected in parallel to the capacitor 54.

Operation of the circuit

The manner of operation of the embodiment illustrated in FIG. 1 will now be explained with reference to the signal diagram given in FIG. 2. The PI controller 15 produces an output signal in dependence on the difference between the reference voltage present at the Zener diode 14 and the portion of the output voltage of the voltage converter set at the variable resistor 18. The capacitor 26 provides the resulting comparison voltage to the noninverting input of the comparator 29. By variation of the resistor 25 the output voltage of the PI controller can be limited by reference to the voltage divider ratio provided by the resistances 24 and 25. This voltage limiting operates as the limiting of the maximum pulse duration of the output signal pulses of the comparator 29 and thus serves to protect the transistor 42 connected as the final stage transistor. The pulse duration of the pulse train provided by the comparator 29 is thereby prevented from being too long during start up and during periods of unusually high output current.

The comparator 29 compares (See FIG. 2) the voltage U 15 with the sawtooth voltage U 30 of the sawtooth wave generator 30. An output signal U 29 is then produced only so long as the sawtooth wave U 30 lies below the voltage U 15.

If the input voltage at the circuit end for energizing the converter rises above the desired output voltage, the voltage U 15 goes to the value 0. The consequence would then be that as the result of the disappearance of the signal U 29, the transistor 42 would no longer be switched on, so that the voltage converter would be shut down. Particularly for security systems it is necessary, however, that the output voltage of the voltage converter should be continuously checked and a warning signal produced in case of interruption or sinking to a very low value. That is produced as explained further below by the components 63-69. Supervision of the output voltage can not, however, distinguish whether the output voltage has collapsed as the result of a defect or as the result of the rise of the input voltage above the output voltage. Consequently, a continuing emergency operation of the voltage converter is maintained by means of the capacitor 39, that has the effect of preventing the collapse of the output voltage of the voltage converter when the input voltage supply rises above the output voltage. At each appearance of one flank of the rectangular pulse sequence at the output of the comparator 31 (through which the sawtooth wave is provided by means of the resistance 33 and the capacitor 34 for supply to the inverting input of the comparator 29) the capacitor 39 provides a short pulse to the non-inverting input of the comparator 29. During this short pulse a transient current surge is produced through the primary winding of the converter transformer 49 that prevents a potential drop in the capacitor 54. The diode 28 serves for recharging the capacitor 39.

The signal sequence U 29 is amplified by the three transistors 40, 41 and 42, by which corresponding current flow periods are produced in the primary winding of the converter transformer 49. The transformer thereby picks up corresponding magnetic energy and gives it off through the diode 53 to the capacitor 54, raising its voltage, until the next signal. The voltage of the capacitor 54 is regulated by the regulation circuit already described.

The three-stage combination of transistors 40, 41 and 42 is so constituted with its npn-pnp-npn sequence that the voltage converter operates all the way down to very small input supply voltages. This characteristic is to a great degree provided by the fact that the emitter of the transistor 41 is directly connected to the supply voltage. The dynamic voltage drop at the input transistor 40 can also be used for driving the circuit. Since the control current of the transistor 42 is conducted through the series circuit constituted by the resistance 46 and the inductance 47, the resistance 46 can be designed to have a very low ohmic value (i.e. 1.5 ohms), since at high input supply voltages and correspondingly short control signals the base current is limited by the inductance 47, whereas at low supply voltage (low battery voltage when a storage battery is involved, as in the case of equipment in a motor vehicle), when there are relatively long control signals, the effect of this inductance 47 is negligible. A diode 70 connected in parallel to the inductant 47 serves as a reverse-kick bypass diode. The diode 43 serves for blocking negative disturbing pulses, whereas the Zener diode 52 excludes positive disturnance pulses that exceed the Zener voltage.

The circuit containing the components 57–61 has two functions: the suppression of converter operation during the start-up phase and protection in the case of short-circuiting of the output. The effective supply voltage at the capacitor 12 is compared with the output voltage of the voltage converter at the terminal 16 by means of the two voltage dividers 57, 58 and 60, 61. Both during the start-up phase and during a short circuit, a very low value of voltage is present at the terminal 16, so that the output of the comparator 59 goes to zero potential. This zero potential pulls down the noninverting input of the comparator 29 likewise to zero potential, suppressing the signal sequence U 29. This suppression during the start-up phase serves, on the one hand, to protect the voltage converter under heavy load, and, on the other hand, when a capacitive energy reserve must be served by the voltage converter, i.e. in a security system of the kind show in German Patent 22 32 179, which corresponds to U.S. Pat. No. 3,753,001 allows the checking of this energy reserve for its proper operation after the switching on of such a security system. The voltage converter consequently exerts no influence on or disturbance of this checking out of the energy reserve and produces a "soft start" after a preliminary suppression of the converter operation during the charging up of capacitor 26. The output voltage of the voltage converter, produced by the voltage at the capacitor 54, is limited in a simple way by the Zener diode 62. If the voltage rises above the limit value, the Zener diode 62 breaks down and pulls down the voltage of the noninverting input of the comparator 29 towards zero potential in accordance with the above circuit operation description.

The monitoring of the converter function is provided by the components 62 to 69.

If the voltage at the capacitor 54 exceeds a voltage which is the permissible minimum, the transistor 66 is conducting and the transistor 65, accordingly is blocked. The monitor lamp 63 is not illuminated. If the output voltage sinks below this minimum value, both transistors 65 and 66 switch over and the monitor lamp 63 lights up, indicating a failure or malfunction.

The four comparators are preferably constituted by a commercially available quadruple comparator integrated circuit.

Although the invention has been described by reference to a particular illustrative example, it will be understood that modifications and variations are possible within the inventive concept.

We claim:

1. Regulated d.c. voltage converter comprising a voltage conversion transformer followed by a rectifier, means for supplying, from d.c. input energy, an alternatingly switched voltage wave to said transformer, and a voltage regulator, to which a reference voltage as well as the rectified voltage output of said transformer are supplied for comparison in said regulator, being connected for modifying said alternately switched voltage wave, and further comprising:
   a sawtooth vave generator (30) and a first comparator (29) provided in said alternatingly switched voltage wave supplying means, said first comparator having its output connected for supplying pulses for controlling the input wave for said transformer and having its inputs respectively connected to the output of said sawtooth wave generator and to the output of said regulator (15), said regulator being constituted as a proportional-integral controller circuit and having its output connected to the tap of a voltage divider (24, 25) for output voltage limiting.

2. Voltage converter as defined in claim 1, in which the voltage supply of said voltage regulator is provided with a series diode (11) and a parallel storage capacitor (12) and said voltage divider (24, 25) is connected across said storage capacitor (12), and in which a second storage capacitor (26) is provided across the output voltage of said voltage regulator (15).

3. Voltage converter as defined in claim 1, in which voltage supply for the electronic components of the circuits of said regulator (15), a first comparator (29) and sawtooth wave generator (30) is provided through diodes (56, 11) both from the supply voltage of said voltage converter and from the rectified output of said transformer (49), said voltage divider (24, 25) being connected across said supply voltage of said voltage converter.

4. Regulated d.c. voltage converter comprising a voltage conversion transformer followed by a rectifier, means for supplying, from d.c. input energy, an alternatingly switched voltage wave to said transformer, and a voltage regulator, to which a reference voltage as well as the rectified voltage output of said transformer are supplied for comparison in said regulator, being connected for modifying said alternately switched voltage wave, and further comprising:

a sawtooth wave generator (30) and a first comparator (29) provided in said alternatingly switched voltage wave supplying means, said first comparator having its inputs respectively connected to the output of said sawtooth wave generator and to the output of said regulator (15) and having its output connected for supplying voltage pulses controlling the input wave for said transformer, said sawtooth wave generator (30) also being connected to the input of said first comparator (29) to which the output of said voltage regulator (15) is connected, in such a manner as to supply a pulse thereto in response to a flank of the sawtooth wave produced by said sawtooth wave generator (30).

5. Regulated d.c. voltage converter comprising a voltage conversion transformer followed by a rectifier, means for supplying, from d.c. input energy, an alternatingly switched voltage wave to said transformer, and a voltage regulator, to which a reference voltage as well as the rectified voltage output of said transformer are supplied for comparison in said regulator, being connected for modifying said alternately switched voltage wave, and further comprising:

a sawtooth wave generator (30) and a first comparator (29) provided in said alternatingly switched voltage wave supplying means, said first comparator having its inputs respectively connected to the output of said sawtooth wave generator and to the output of said regulator (15) and having its output connected for supplying voltage pulses controlling the input wave for said transformer, and a second comparator (59) for comparing the output voltage and the supply voltage of the voltage converter, connected so that in response to the fall of the output voltage of the voltage converter below a settable proportion of the input voltage, said second comparator (59) will cause a lowering of the voltage at the input of said first comparator (29) to which is applied the output voltage of said voltage regulator (15).

6. Voltage converter as defined in claim 5, in which a Zener diode (62) is interposed between the inverting input of said second comparator (59) and the output connection of the rectifier following said transformer (49) for limiting the rectified output voltage of said transformer (49).

7. Voltage converter as defined in any one of claims 1 or 2-6, in which the output of said first comparator (29) is connected for supplying voltage pulses controlling the input wave for said transformer (49) through a three-stage transistor circuit (40-42) in which the transistors of the first and third stages are npn transistors and the second stage transistor (41) is a pnp transistor having its emitter connected directly to the supply voltage of the voltage converter.

8. Voltage converter as defined in claim 7, in which the third stage transistor (42) of said three-stage transistor circuit has its switching path connected in the primary circuit of said transformer (49) and has an inductance (47) connected in its base current circuit.

9. Voltage converter circuit as defined in claim 7, in which said switching path of said third-stage transistor (42) of said three-stage transistor circuit is connected to apparatus ground potential through a diode (50) for protection against mispolarity.

10. Voltage converter as defined in any one of claims 1 or 2-6, in which means (64-69) are provided for activating a monitoring indicator to show whether the rectified output voltage of said transformer (49) exceeds a predetermined threshold.

11. Voltage converter as defined in claim 7, in which means (64-69) are provided for activating a monitoring indicator to show whether the rectified output voltage of said transformer (49) exceeds a predetermined threshold.

12. Voltage converter as defined in claim 8, in which means (64-69) are provided for activating a monitoring indicator to show whether the rectified output voltage of said transformer (49) exceeds a predetermined threshold.

13. Voltage converter as defined in claim 9, in which means (64-69) are provided for activating a monitoring indicator to show whether the rectified output voltage of said transformer (49) exceeds a predetermined threshold.

* * * * *